United States Patent [19]

Imai et al.

[11] Patent Number: 4,806,618

[45] Date of Patent: Feb. 21, 1989

[54] AROMATIC POLYETHERS HAVING BIPHENYLFLUORENE GROUP

[75] Inventors: Yoshio Imai, Tokyo; Masaaki Kakimoto, Yokohama; Yutaka Maruyama, Kamifukuoka; Toshio Koishi, Sakao, all of Japan

[73] Assignee: Central Glass Company, Limited, Ube, Japan

[21] Appl. No.: 115,914

[22] Filed: Nov. 2, 1987

[30] Foreign Application Priority Data

Nov. 11, 1986 [JP] Japan .................. 61-266614
Nov. 11, 1986 [JP] Japan .................. 61-266615

[51] Int. Cl.$^4$ .................................. C08G 63/18
[52] U.S. Cl. ...................... 528/125; 528/126; 528/128; 528/190; 528/194; 525/173; 525/174
[58] Field of Search ............ 528/125, 126, 128, 190, 528/194; 525/173, 174, 177

[56] References Cited

U.S. PATENT DOCUMENTS 4,598,137  7/1986  Guiver et al. ............... 528/173
4,612,350  9/1986  Parker ........................ 528/125

FOREIGN PATENT DOCUMENTS 5490296  7/1979  Japan .

*Primary Examiner*—John Kight
*Assistant Examiner*—M. L. Moore
*Attorney, Agent, or Firm*—Fleit, Jacobson, Cohn & Price

[57] ABSTRACT

Novel aromatic polyethers excellent in heat resistance and soluble in various organic solvents are obtained by introducing 9,9-biphenylfluorene group, optionally together with another divalent aromatic group, into the structural units of a polyether derived from either diphenyl ketone or diphenyl sulfone.

2 Claims, No Drawings

AROMATIC POLYETHERS HAVING BIPHENYLFLUORENE GROUP

BACKGROUND OF THE INVENTION

This invention relates to a group of novel aromatic polyethers having 9,9-biphenylfluorene group in their repeating units. The novel aromatic polyethers are useful as heat resistant synthetic resins having good solubilities in various organic solvents.

Some aromatic polyethers are known as highly heat-resistant plastic materials. Particularly aromatic polyethers shown in JP-A No. 54-90296, which have repeating units derived from diphenyl ketone or diphenyl sulfone, are excellent in mechanical characteristics such as tensile strength, elastic modulus and impact resistance, thermal properties represented by heat distortion temperature and thermal decomposition temperature and electrical properties represented by dielectric strength. However, industrial use of such aromatic polyethers as synthetic resins is quite limited since the polyethers are hardly soluble in organic solvents.

Even though a polymer possesses attractive properties the polymer is of little value as an industrial plastic material unless it has good moldability and/or good solubilities in solvents low in price and convenient for industrial handling. With respect to aromatic polyethers which have excellent heat resistance and lack melt-moldability, it is keenly desired to afford good solubilities in commonplace solvents to the polymers since practical applications of the polymers will expand if solutions are readily available for spinning into fibers, casting into films and for other purposes such as coating, painting and cementing.

SUMMARY OF THE INVENTION

It is an object of the present invention to provide novel aromatic polyethers which are soluble in various organic solvents and possess excellent heat resistance and mechanical characteristics.

The present invention provides aromatic polyethers represented by the general formula (1):

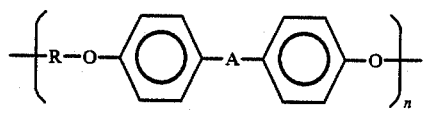

wherein R represents one 9,9-biphenylfluorene group or at least two kinds of divalent aromatic groups including at least one 9,9-biphenylfluorene group, A represents one carbonyl group or one sulfonyl group, and n is an integer from 1 to 200.

That is, we have accomplished the above stated object by introducing 9,9-biphenylfluorene group into the structural units of a polyether derived from diphenyl ketone or diphenyl sulfone.

Aromatic polyethers of the invention are readily soluble in various popular organic solvents and, therefore, can easily be formed into filaments, sheets or films from solutions. Beseides, these polyethers are excellent in heat resistance and have good mechanical properties. Most of these polyethers do not undergo thermal decomposition at temperatures below 500° C., and films formed from solutions of these polyethers are tough, colorless and transparent. Accordingly these polyethers are of value as industrial plastic materials for varnishes, paints, protective coatings, adhesives, heat resistant fibers, etc.

An aromatic polyether according to the invention is prepared by heating a benzophenone dihalide or a benzosulfone dihalide and an alkali metal salt of a dihydric phenol having 9,9-biphenylfluorene group in an organic solvent to thereby accomplish condensation polymerization. Optionally, at least one other kind of dihydric phenol in the form of an alkali metal salt, which needs not to have biphenylfluorene group, may be incorporated in the reactants.

DESCRIPTION OF THE PREFERRED EMBODIMENTS

Aromatic polyethers of the invention are divided into diphenyl ketone type polyethers and diphenyl sulfone type polyethers represented by the general formulas (2) and (3), respectively.

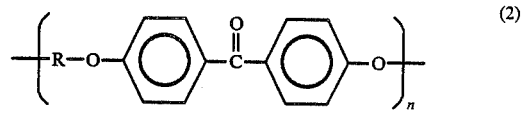

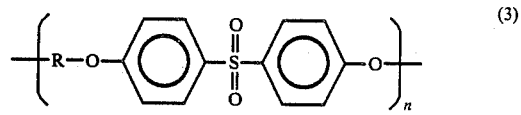

wherein R and n are as defined hereinbefore with respect to the general formula (1).

In preparing a polyether represented by the general formula (2) it is preferred to use either 4,4'-dichlorobenzophenone or 4,4'-difluorobenzophenone as the aforementioned dihalide. As the essential dihydric phenol, 9,9-bis(4-hydroxyphenyl)fluorene is preferred. Good examples of optionally incorporatable dihydric phenols are hydroquinone, 1,1,3-trimethyl-3-(4'-hydroxyphenyl)-5-indanol, 4,4'-dihydroxybiphenyl, 2,2'-bis(4-hydroxyphenyl)propane, 2,2'-bis(4-hydroxyphenyl)hexafluoropropane, 4,4'-dihydroxydiphenylsulfone and 4,4'-dihydroxybenzophenone. Every dihydric phenol is used in the form of an alkali metal salt such as sodium salt or potassium salt. An alkali metal salt of a dihydric phenol is obtained by reacting the dihydric phenol with double mols of an alkali metal hydroxide such as sodium hydroxide or potassium hydroxide in an organic solvent. It is important that the total quantity of the dihydric phenol(s) be approximately equivalent, by mol, to the quantity of the benzophenone dihalide. Otherwise, it is difficult to desirably augment the degree of polymerization.

The condensation polymerization reaction of the above monomers is carried out in an organic solvent at an elevated temperature. It is suitable to use a polar solvent such as N-methylpyrrolidone, N-cyclohexylpyrrolidone, dimethyl sulfoxide, dimethylformamide, dimethylacetamide, sulfolane, dimethyl sulfone or diphenyl sulfone.

A polyether represented by the general formula (3) is prepared by the same method except using a benzosulfone dihalide instead of the benzophenone dihalide. As the benzosulfone dihalide, either 4,4'-dichlorobenzosulfone or 4,4'-difluorobenzosulfone is preferred.

An alternative method for preparing a desired polyether is reacting either a benzophenone dihalide or a benzosulfone dihalide, a dihydric phenol having 9,9- biphenylfluorene group, optional dihydric phenol(s) and an alkali metal carbonate in an organic solvent. As the alkali metal carbonate either sodium carbonate or potassium carbonate is preferred, and it is preferable to use an anhydrous carbonate. It is suitable to use approximately 2 mols of alkali metal carbonate per 1 mol of the total dihydric phenol. If the quantity of the alkali metal carbonate is smaller the condensation polymerization reaction will not be completed. However, use of a larger quantity of the carbonate does not favorably affect the polymerization reaction and is unfavorable from an economical point of view. Also it is important that the quantity of the dihydric phenol(s) be approximately equivalent, by mol, to the quantity of the benzophenone or benzosulfone dihalide. A suitable organic solvent can be selected from the above named polar solvents.

By the alternative method a polyether is formed probably through two-stage reactions. At the first stage the alkali metal carbonate reacts with each dihydric phenol to form an alkali metal salt of the phenol. Succeedingly, condensation polymerization reaction of the benzophenone or benzosulfone dihalide with the alkali metal salt(s) of the dihydric phenol(s) begins and proceeds. Since the first-stage reaction is a dehydrating equilibrium reaction, this reaction can be promoted by removing by-produced water. An effective and convenient measure for removal of the water is carrying out the reaction in the presence of an organic solvent which makes an azeotrope with water. For example, benzene, chlorbenzene or toluene is useful as such an organic solvent. During the first-stage reaction the reaction system is kept heated nearly at the azeotropic point of water and the added solvent, viz. at a temperature ranging from about 50° C. to about 200° C., until dissolution of the azeotropy. Then the reaction temperature is further raised to promote the condensation polymerization reaction. In theory it is favorable for this reaction to greatly raise the temperature, but in practice the reaction is carried out at the reflux temperature of the organic solvent used as the reaction medium. Usually the reaction is completed in several hours.

The invention is further illustrated by the following nonlimitative examples.

EXAMPLE 1

In a 100 ml three-necked flask provided with a nitrogen gas inlet and a Dean-Stark trap, 3.50 g of 9,9-bis(4-hydroxyphenyl)fluorene and 2.18 g of 4,4'-difluorobenzophenone were charged together with 17 ml of 1-methyl-2-pyrrolidone, 14.4 ml of toluene and 1.49 g of well dried anhydrous potassium carbonate.

In a nitrogen gas stream the solution in the flask was stirred and gradually heated until commencement of reflux of toluene. Water formed by the initial reaction was separated from the reaction system by azeotropic boiling together with toluene and removed by the Dean-Stark trap. After completing the removal of water the temperature in the flask was raised to 160°–170° C., and the reaction was continued for 6 hr. Then the reaction liquid was poured into a large quantity of water to precipitate a polymer formed by the reaction. The polymer was washed first with distilled water and then with methanol and was dried.

The quantity of the obtained polymer was 4.92 g, so that the yield of the reaction was 93.1%. In o-chlorophenol the intrinsic viscosity of this polymer was 0.573 dL/g at 30° C. By infrared absorption spectrum analysis, the polymer exhibited absorptions at 1650 cm$^{-1}$ (C=O) and 1250 cm$^{-1}$ (C—O—C). Elementary analysis of the polymer gave the following result.

Calculated (%): C 86.34, H 4.58, O 9.08. Found (%): C 86.23, H 4.24, O 9.53.

Therefore, the obtained polymer was confirmed to be a polyether represented by the following formula.

Thermal properties of this polyether and other polyethers prepared in the subsequent examples are shown in Table 1.

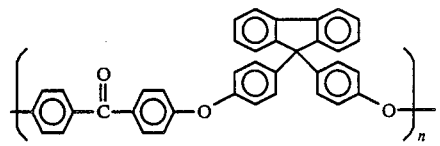

EXAMPLE 2

The entire process of Example 1 was repeated except that 2.54 g of 4,4'-difluorobenzosulfone was used in place of 4,4'-difluorobenzophenone. As the result 5.60 g (yield 99.2%) of a polymer was obtained. In o-chlorophenol the intrinsic viscosity of the polymer was 0.50 dL/g at 30° C.

The obtained polymer exhibited infrared absorptions at 1240 cm$^{-1}$ (C—O—C) and at 1395 cm$^{-1}$ and 1200 cm$^{-1}$ (SO$_2$). Elementary analysis gave the following result.

Calculated (%): C 78.70, H 4.28. Found (%): C 78.12, H 4.80.

Therefore, the obtained polymer was confirmed to be a polyether represented by the following formula.

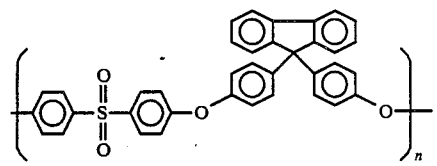

EXAMPLE 3

In a mixture of 17 ml of 1-methyl-2-pyrrolidone and 14.4 ml of toluene, 1.75 g of 9,9-bis(4-hydroxyphenyl)-fluorene, 0.55 g of hydroquinone, 2.18 g of 4,4'-difluorobenzophenone and 1.49 g of anhydrous potassium carbonate were subjected to reaction in the same manner as in Example 1. As the result 4.08 g (yield 100%) of a polymer was obtained. In o-chlorophenol the intrinsic viscosity of the polymer was 0.685 dL/g at 30° C. The polymer exhibited infrared absorptions at 1650 cm$^{-1}$ (C=O) and 1250 cm$^{-1}$ (C—O—C), and the result of elementary analysis was as follows.

Calculated (%): C 83.81, H 4.44, O 11.75. Found (%): C 84.36, H 4.53, O 11.11.

Therefore, the polymer was confirmed to be a polyether represented by the following formula.

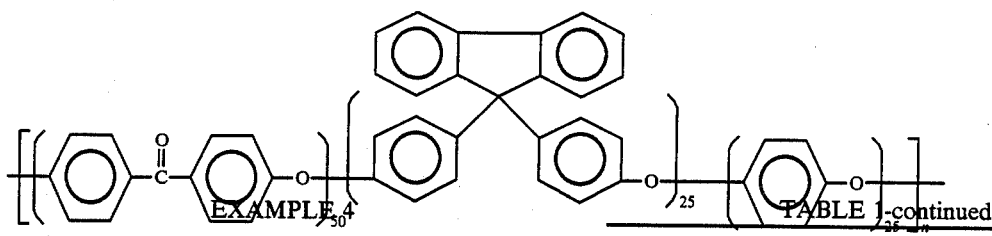

EXAMPLE 4

The reaction of Example 3 was repeated except that 2.54 g of 4,4'-difluorobenzosulfone was used in place of the difluorobenzophenone. As the result 4.39 g (yield 98.8%) of a polymer was obtained. In o-chlorophenol the intrinsic viscosity of the polymer was 0.48 dL/g at 30° C. The polymer exhibited infrared absorptions at 1240 cm$^{-1}$ (C—O—C) and at 1395 cm$^{-1}$ and 1200 cm$^{-1}$ (SO$_2$), and the result of elementary analysis was as follows.

Calculated (%): C 73.97, H 4.51. Found (%): C 73.09, H 4.60.

Therefore, the polymer was confirmed to be a polyether represented by the following formula.

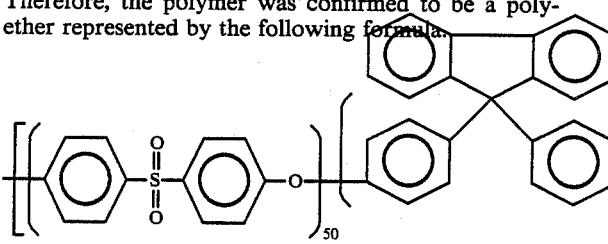

COMPARATIVE EXAMPLE

In a mixture of 17 ml of 1-methyl-2-pyrrolidone and 14.4 ml of toluene, 1.10 g of hydroquinone, 2.18 g of 4,4'-difluorobenzophenone and 1.49 g of anhydrous potassium carbonate were subjected to reaction in the same manner as in Example 1. As the result 2.82 g (yield 98%) of a polymer was obtained. In sulfuric acid the intrinsic viscosity of the polymer was 0.50 dL/g at 30° C. The polymer exhibited infrared absorptions at 1650 cm$^{-1}$ (C=O) and 1250 cm$^{-1}$ (C—O—C), and the result of elementary analysis was as follows.

Calculated (%): C 79.15, H 4.20, O 16.65. Found (%): C 79.18, H 4.16, O 16.66.

Therefore, the polymer was confirmed to be a polyether represented by the following formula.

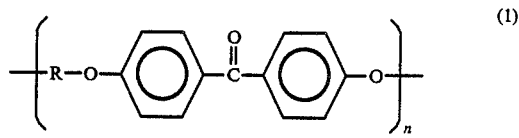

TABLE 1

| Polyether | Glass Transition Temperature (°C.) | Melting Point (°C.) | 10% Thermal Decomposition Temperature (°C.) |
| --- | --- | --- | --- |
| Ex. 1 | 251 | — | 508 |
| Ex. 2 | 280 | — | 560 |
| Ex. 3 | 208 | — | 511 |
| Ex. 4 | 251 | — | 516 |
| Comp. | 143 | 336 | 545 |

TABLE 1-continued

| Polyether Ex. | Glass Transition Temperature (°C.) | Melting Point (°C.) | 10% Thermal Decomposition Temperature (°C.) |
| --- | --- | --- | --- |

Solubilities of the polyethers prepared in Examples 1–4 and Comparative Example in several kinds of organic solvents were as shown in Table 2, wherein the evaluation marks A to D indicate the following results, respectively.

A: rapidly dissolved.
B: dissolved.
C: swelled or partially dissolved.
D: insoluble.

TABLE 2

| | Polyether | | | | |
| --- | --- | --- | --- | --- | --- |
| Solvent | Ex. 1 | Ex. 2 | Ex. 3 | Ex. 4 | Comp. Ex. |
| benzene | C | D | C | D | D |
| dimethylformamide | C | A | A | A | D |
| chloroform | A | A | A | A | D |
| m-cresol | B | A | A | A | D |
| tetrachloroethane | A | A | A | A | D |
| 1-methyl-2-pyrrolidone | A | A | A | A | D |
| o-chlorophenol | A | A | A | A | D |

The polyethers of Examples 1 to 4 were each dissolved in tetrachloroethane, and each solution was spread on a flat metal surface and dried. In every case a tough and transparent film was formed.

What is claimed is:

1. An aromatic polyether represented by the general formula (1):

(1)

wherein R represents one 9,9-biphenylfluorene group or at least two divalent aromatic groups including at least one 9,9-biphenylfluorene group, and n is an integer from 1 to 200.

2. An aromatic polyether according to claim 1, wherein said R represents one 9,9-biphenylfluorene group and another divalent aromatic group selected from the group consisting of phenylene group, biphenylene group, 2,2'-diphenylenepropane group, 2,2'-diphenylenehexafluoropropane group, and diphenylene ketone group.

* * * * *